United States Patent
Zhai et al.

(10) Patent No.: US 11,308,223 B2
(45) Date of Patent: Apr. 19, 2022

(54) BLOCKCHAIN-BASED FILE HANDLING

(71) Applicant: KYNDRYL, INC., New York, NY (US)

(72) Inventors: Yu Lin Zhai, Beijing (CN); Zi Jian Ji, Beijing (CN); Si Heng Sun, Xian (CN); Yuan Yuan Li, Beijing (CN); Xiao Lu Wang, Beijing (CN); Yue Zhang, Beijing (CN)

(73) Assignee: Kyndryl, Inc., New York, NY (US)

( * ) Notice: Subject to any disclaimer, the term of this patent is extended or adjusted under 35 U.S.C. 154(b) by 207 days.

(21) Appl. No.: 16/676,998

(22) Filed: Nov. 7, 2019

(65) Prior Publication Data
US 2021/0141909 A1    May 13, 2021

(51) Int. Cl.
| | |
|---|---|
| G06F 21/60 | (2013.01) |
| G06F 16/13 | (2019.01) |
| G06F 16/174 | (2019.01) |
| G06F 21/62 | (2013.01) |
| H04L 9/06 | (2006.01) |
| G06F 16/17 | (2019.01) |

(52) U.S. Cl.
CPC ............ *G06F 21/602* (2013.01); *G06F 16/13* (2019.01); *G06F 16/1734* (2019.01); *G06F 16/1744* (2019.01); *G06F 21/6218* (2013.01); *H04L 9/0637* (2013.01); *H04L 2209/38* (2013.01)

(58) Field of Classification Search
CPC .... G06F 21/602; G06F 16/13; G06F 16/1744; G06F 21/6218; G06F 16/1734; G06F 21/64; H04L 9/0637; H04L 2209/38; H04L 9/3239
See application file for complete search history.

(56) References Cited

U.S. PATENT DOCUMENTS

| | | | |
|---|---|---|---|
| 10,880,070 B1 * | 12/2020 | Delaney | ................ H04L 9/3239 |
| 2019/0013934 A1 * | 1/2019 | Mercuri | ................ G06Q 20/06 |
| 2019/0013948 A1 * | 1/2019 | Mercuri | ................ H04L 9/0643 |
| 2019/0068615 A1 | 2/2019 | Pack et al. | |
| 2020/0125757 A1 * | 4/2020 | McKendree | ......... G06Q 50/205 |

FOREIGN PATENT DOCUMENTS

WO    2019098895 A1    5/2019

OTHER PUBLICATIONS

Steichen, M., et al., "Blockchain-Based, Decentralized Access Control for IPFS", 2018 IEEE, pp. 1499-1506.
Goyal, P., et al., "Secure Incentivization for Decentralized Content Delivery", Aug. 2, 2018, 8 pgs.
Well, Peter, et al., "The NIST Definition of Cloud Computing", NIST Special Publication 800-145, Sep. 2011, Gaithersburg, MD, 7 pgs.

* cited by examiner

*Primary Examiner* — Abiy Getachew
(74) *Attorney, Agent, or Firm* — Ken Han; Matthew M. Hulihan; Heslin Rothenberg Farley & Mesiti PC

(57) ABSTRACT

Blockchain-based file handling is provided by receiving a data file from a user device, storing the data file to local storage of the blockchain peer, generating a file identifier of the data file, providing the file identifier to the user device, storing the file identifier to a synchronized ledger of the blockchain network, where the synchronized ledger tracks access to the data file, and distributing data of the data file to one or more other blockchain peers of the blockchain network.

15 Claims, 9 Drawing Sheets

BLOCKCHAIN-BASED FILE HANDLING

BACKGROUND

Blockchain technology is becoming increasingly popular as decentralization is being more widely accepted by stakeholders. First-generation blockchain technology effectively utilizes a centralized, synchronized ledger held by each peer to distribute transaction data. Improper changes to the ledger can be refused and/or a prior-state of the ledger can be recovered by the peers. Second-generation blockchain technology is a vehicle for implementation of programmable transactions ('smart contracts') providing more flexibility.

SUMMARY

Shortcomings of the prior art are overcome and additional advantages are provided through the provision of a computer-implemented method. The method receives, by a blockchain peer of a blockchain network, a data file from a user device. The method stores, by the blockchain peer, the data file to local storage of the blockchain peer. The method generates a file identifier of the data file, provides the file identifier to the user device, and stores the file identifier to a synchronized ledger of the blockchain network. The synchronized ledger tracks access to the data file. The method also distributes data of the data file to one or more other blockchain peers, of blockchain peers, of the blockchain network.

Further, a computer program product including a computer readable storage medium readable by a processing circuit and storing instructions for execution by the processing circuit is provided for performing a method. The method receives, by a blockchain peer of a blockchain network, a data file from a user device. The method stores, by the blockchain peer, the data file to local storage of the blockchain peer. The method generates a file identifier of the data file, provides the file identifier to the user device, and stores the file identifier to a synchronized ledger of the blockchain network. The synchronized ledger tracks access to the data file. The method also distributes data of the data file to one or more other blockchain peers, of blockchain peers, of the blockchain network.

Yet further, a computer system is provided that includes a memory and a processor in communication with the memory, wherein the computer system is configured to perform a method. The method receives, by a blockchain peer of a blockchain network, a data file from a user device. The method stores, by the blockchain peer, the data file to local storage of the blockchain peer. The method generates a file identifier of the data file, provides the file identifier to the user device, and stores the file identifier to a synchronized ledger of the blockchain network. The synchronized ledger tracks access to the data file. The method also distributes data of the data file to one or more other blockchain peers, of blockchain peers, of the blockchain network.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
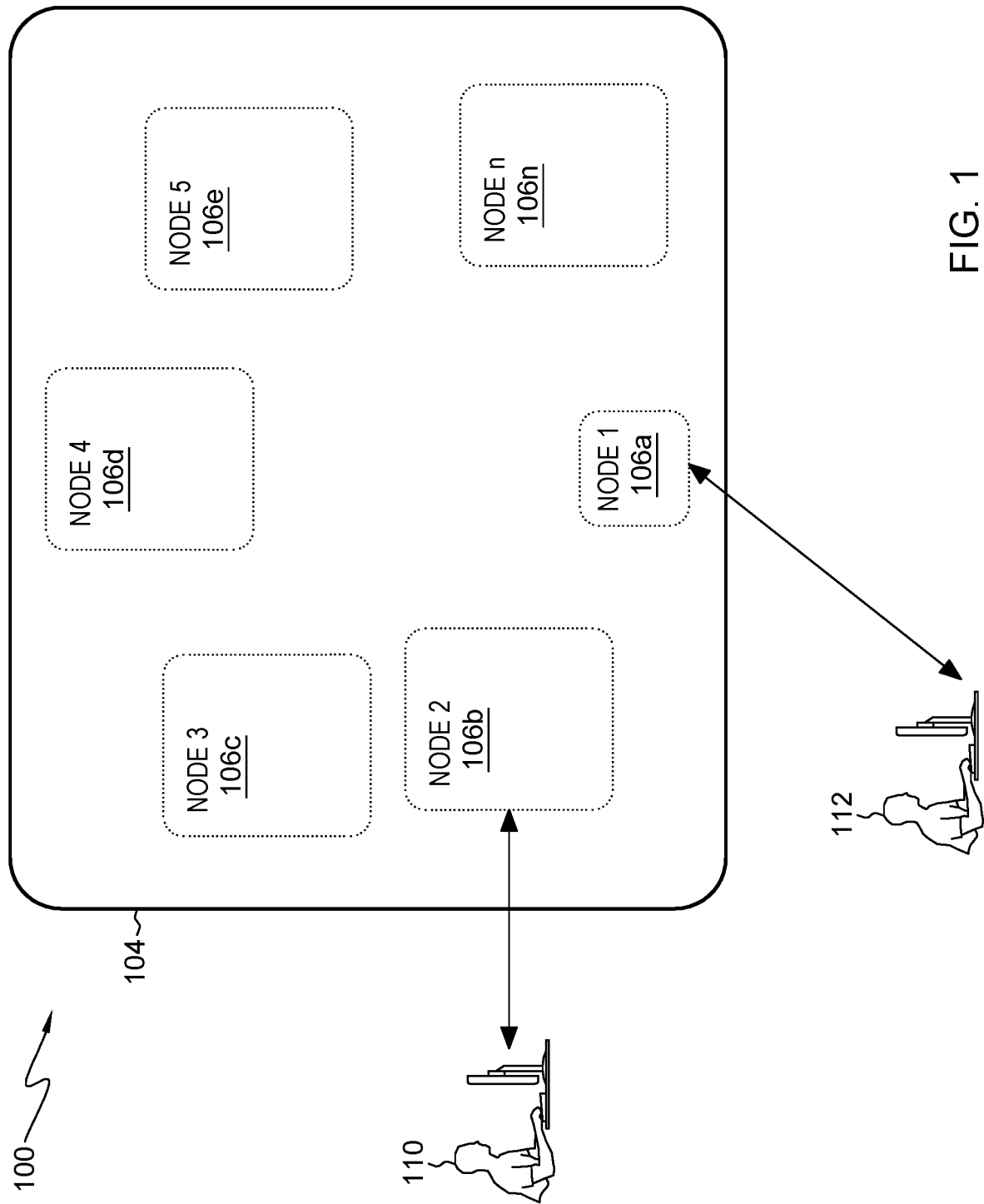
FIG. 1 depicts an example environment to incorporate and use with aspects described herein.

First-generation blockchain stores ledger information at the peers. The ledger information includes objects that are relatively simple, including numbers of different transactions. Second-generation blockchain and smart contracts enable some variety in the transactions being pursued. Even so, objects that are the subject of smart contracts could potentially be relatively large. A smart contract might involve an image or video of several megabytes, for instance. Other objects might be much larger—on the order of a couple hundred megabytes or bigger. Data files of this size and format cannot presently be stored on the blockchain. Instead, in one approach, they are managed by each individual peer itself. This means that the data is not securely decentralized because file handling is not being adequately tracked by the blockchain and recorded on a ledger. If a blockchain peer of the blockchain network accesses (views, modifies, copies, etc.) such a data file, there will not necessarily be any record of that on the ledger and if a nefarious actor receives and destroys the data file, there is no guarantee that the file can be recovered by the blockchain peers.

Described herein are approaches for blockchain-based file handling that enables, for instance, improvements in the tracking and control of access to data files that are the subject of smart contracts.

Aspects differ from conventional peer-to-peer (p2p) approaches that do not utilize or rely on blockchain technology. In a conventional p2p approach, if a peer accesses/downloads a data files from p2p storage, this behavior is not necessarily tracked to enable all authorized peers to see the history of which peers were involved in the view, modification, etc. of the data file on p2p storage. Aspects described herein leverage a decentralized, synchronized ledger to record behavior by other peers in the handling of a data file stored to the blockchain network. A data filed store to the blockchain network is backed-up/replicated among other blockchain peer(s) (also referred to herein as 'nodes or 'servers' of the blockchain network). Access performed with respect to the file (view, read, save, change, copy, delete, etc.) is logged to the distributed ledger and synchronized to other peers. If a data file is lost or a peer damages or otherwise improperly modifies the data file, then other blockchain peers see that activity and one or more such peers can recover the data file from backup(s)/(replica(s) on the blockchain network. Such recovery can be vital to business processes, including those based on the integrity of the ledger and data files passed through the blockchain network. In this manner, based on loss and/or improper modification of data of a data file at a blockchain peer, that data of the data file can be received from other blockchain peer(s) to restore the data of the data file to the blockchain peer, as described herein.

As noted, nodes of the blockchain network can have a facility to track and manage handling of the data file, i.e. in order to record the behavior to the ledger. Access to the data file, and optionally to the ledger data that logs such behavior performed against data file, can be controlled. Security levels can be established, for instance by an administrative or other overseeing entity of the blockchain network, where differing security levels grant different permissions to different peers depending on the level of access the peers are to have. Each blockchain peer can be function at a respective security level that dictates the peer's ability to access the data file and/or portions of the ledger that log monitored behavior with respect to that data file. Some peers might be able to view the ledger entries but have no read/view access to the data file itself, for instance. The synchronized ledger can track access of the data file on the blockchain network, where view of that tracked access is regulated. For instance, only some blockchain peers of the blockchain network many be able to view the tracked access. Membership in different security levels can be managed via configuration data, for instance a configuration data file, and security can be managed at any level of granularity. For instance, a blockchain peer with read and write access to a first data file may only have read access to a second data file, and no read or write access to a third data file on the network.

Security levels may be more easily controlled in a private blockchain environment than in a public blockchain environment, though aspects could also be applied to a public blockchain. A blockchain peer itself, for instance one through which a data file is introduced into the blockchain network, could be the responsible authority (perhaps at the direction of a user/user device that originates the file) for setting security restrictions on file access.

Additional aspects can include monitoring storage space on blockchain peers of the blockchain network and determining based on a replication policy how to distribute the data file to different blockchain peer(s). The policy could dictate, for instance, the number of peers to which the data should be backed-up, whether the data file should be split into multiple separate files/segments and then distributed (and which peers should receive which segments), and whether to apply other modifications to the data file for storage, for instance whether to compress and/or encrypt the data file or segments thereof. If a data file is compressed and/or encrypted, the compressed/encrypted file can be distributed to one or more other blockchain peers. If data of the data file is split into separate data files (and optionally encrypted and/or compressed), then such separate data files can be distributed to one or more other blockchain peers.

FIG. 1 depicts an example environment to incorporate and use with aspects described herein. Environment 100 includes a blockchain network 104 accessed by first and second users/user devices 110 and 112, respectively. Blockchain network 104 includes Nodes/servers 1 through n, also referred to as blockchain peers 106a through 106n. In general, the Nodes may be similarly-configured in terms of their programming to communicate with other nodes of the blockchain network and synchronize their ledgers.

The device of the first user 110 accesses the blockchain network 104 by communicating with node 2 (106b), while the device of the second user 112 accesses the blockchain network 104 by communicating with node 1 (106a). Nodes 1 through n of the blockchain network individually communicate with each other in a mesh or other communication approach.

The user devices 110, 112 and blockchain peers 106a through 106n communicate with each other via communications links for communicating data between the components. In some examples, the links could form, be, or include wired or wireless network(s), such that the communication between the components takes place via wired or wireless communication(s) links for communicating data between the components. Such network(s) can include any one or more networks, such as one or more local area networks and/or one or more wide area networks, such as the internet. Communications links can be any wired or wireless communications link, such as wired and/or cellular, Wi-Fi, or other types of wireless connections.

The environment of FIG. 1 is just one example environment to incorporate and use aspects described herein; others are possible and readily recognizable to those having ordinary skill in the art.

Figure 2:
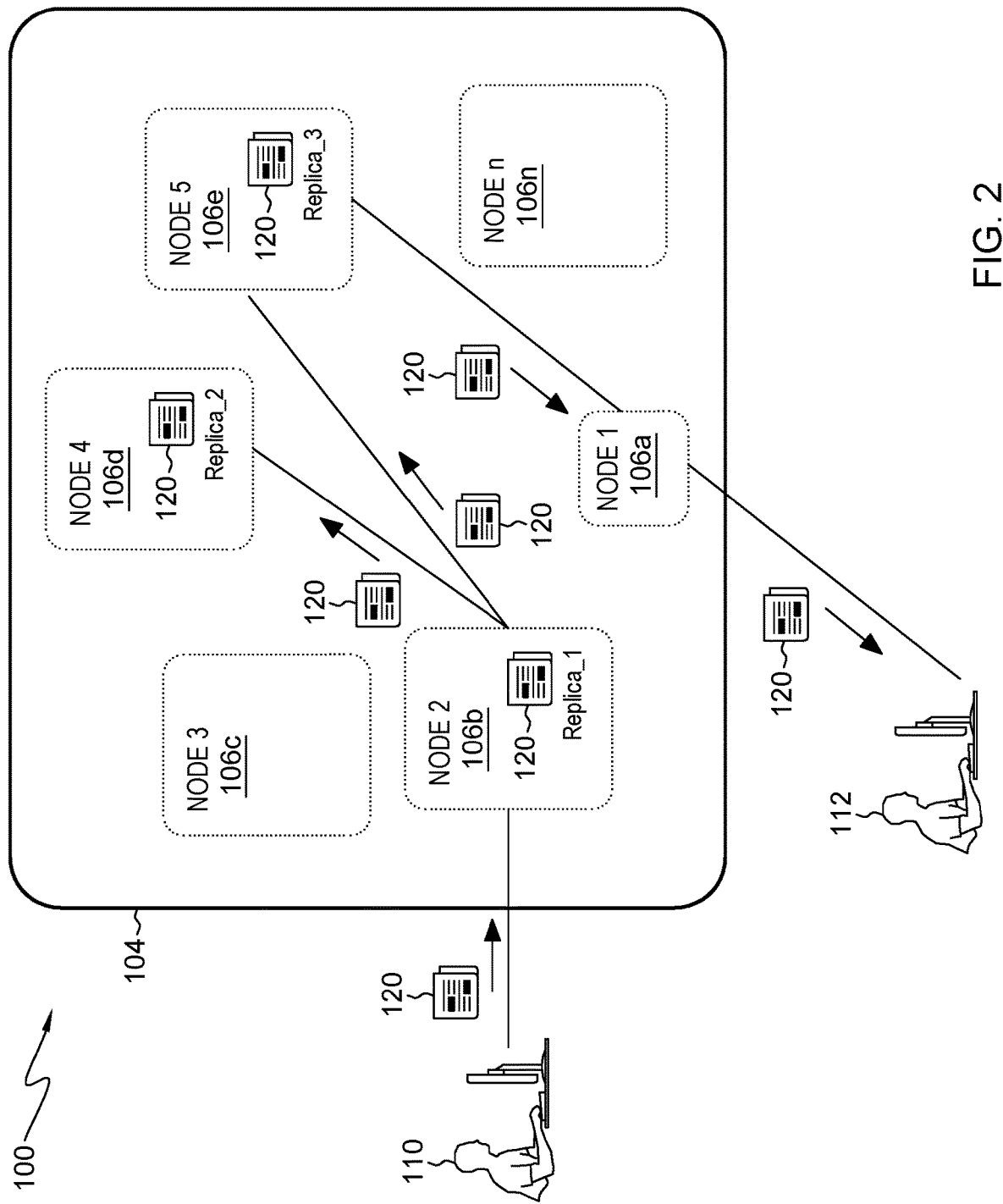
FIG. 2 illustrates an example of blockchain based file handling, in accordance with aspects described herein.

FIG. 2 illustrates an example of blockchain-based file handling, in accordance with aspects described herein. The example environment 100 of FIG. 1 is presented again in FIG. 2 but with additional aspects directed to storage, distribution, and other handling of a data file in the network 104. In this example, first user 110 desires to provide a data file 120 to the blockchain network, for instance to provide access thereto to second user 112. User 110 communicates (i.e. by way of the user's computer system) with network 104, and specifically the 'closest' peer, Node 2 (106b). The user 110 provides the file 120 to Node 2, and Node 2 stores the file to local storage. This stored data file is indicated as Replica 1. At that point, based on policy dictating the replication of the data file to other nodes, a process executing on Node 1 determines one or more other blockchain peers to which to distribute data of the data file. In some examples, this determination is based at least in part on monitoring disk space of the one or more other blockchain peers. In this example, the it is determined to replicate the data file to Nodes 4 and 5, which store to their local storage Replica 2 and Replica 3, respectively. In this case, again based on policy, the file is sufficiently small that it is replicated to Nodes 4 and 5 without first being compressed, and without first being split/divided into separate, smaller data files. Such practice may be employed if the data file is larger in size, for example. In such a situation, the data file is split into separate data files, which are then distributed to other peers. A given peer may or may not receive all such separate data files, and hence the distribution may be of data of the data file, but not necessarily the whole of the data file (whether it be intact or in separate pieces).

In the example of FIG. 2, Node 2 can easily recover the entire data file from either of Node 4 and 5 in the event that it is corrupted or the like at Node 2. This can improve efficiency since each peer storing the file keeps a complete replica of the file. Meanwhile, when another user (user 112 in this example) requests access to the file, the blockchain network can select a 'closest' peer to provide the data, rendering optimal performance. In this example, user 112 communicates with peer Node 1, which does not store the data file. However, Node 1 recognizes that Node 5 stores the data file, retrieves the data file 120 from Node 5, and provides it to user 112 as shown.

If a blockchain peer, perhaps acting at the direction of a user device communicating therewith, views, modifies, copies, or otherwise accesses the data file, this behavior is tracked and record into the decentralized ledger being synchronized between the peers. Other peers of the blockchain network may be able to view such information in the ledger. If a peer B accesses and downloads a data file on behalf of a user, and peer C modifies the data file on behalf of a user, this information is recorded into the ledger. If peer A has access to check such information, peer A can understand who has accessed, downloaded, and modifying the data file.

In another example, a user keeps a set of images for business purpose on the blockchain. Assume that the images are compressed and divided into several smaller pieces. The decision whether to compress file(s) could be based on peer available disk space, for instance when a data file is particularly large such that it would consume too much available disk space at the peers that are to hold a copy of the data file. By splitting a data file/collection of files into smaller pieces, these pieces can be sent to different peers for backup purpose without any individual peer storing the entirety of the data file/collection. In this manner, a respective at least one separate data file, of a plurality of separate data files into which the original data file/collection was split, can be distributed to each of one or more other blockchain peers, and one (or more) such peers might store some, but not all, of that plurality of separate data files.

In this scenario, if the stored images are modified or deleted, the peers storing the data for those images can gather the distributed separate data files and extract/piece them together to recover the images.

Thus, in one example flow, a blockchain peer (node) of a blockchain network receives a data file from a user device and stores it to local storage of the blockchain peer. Then, as explained further herein, it generates a file identifier of the data file, which uniquely identifies the data file/data thereof in the blockchain network. The peer can provide this file identifier to the user device. The file identifier can be used to reference the data file in, for example, a smart contract to be initiated by the user device and that involves the data file. The file identifier can be stored to the synchronized ledger of the blockchain network, which can track access to the data file by way of reference to the unique file identifier. Additionally, the peer distributes data of the data file (e.g. either (i) intact as a single data file, perhaps compressed and/or encrypted if desired, or (ii) a split version thereof in which the data file is split into separate data files for distribution) to one or more other blockchain peers of a plurality of blockchain peers of the blockchain network.

The blockchain-based approach disclosed herein can use a storage evaluation facility to manage the data files and their replicas. The facility, which can run on each individual node, can calculate the size of a new data file (or modified version of existing data file) introduced into the network to the Node by a user device and determine available space of storage of other blockchain peers. The Node can compress the data file and/or split it into separate parts and spread various parts to different peers according to their available storage space for storage. When compressed portions are being distributed, the distribution process can be performed gradually (e.g. in the background) rather than immediately. Time during which the peers involved would otherwise be idle can be utilized to complete this distribution process.

The number of backups for a data file/portions thereof can be defined by policy, for instance in a configuration file. If a data file is corrupted or the like, backup(s) can be gathered from storage of different peers in order to recover the file. Meanwhile, a user accessing a file can retrieve the file from the peer(s) that are closest to the peer with which the user's device communicates to access the blockchain network. Data of the data file can be downloaded from one or more peers and gathered together (if retrieved in separate pieces) to extract the data file for the requesting user.

Figure 3:
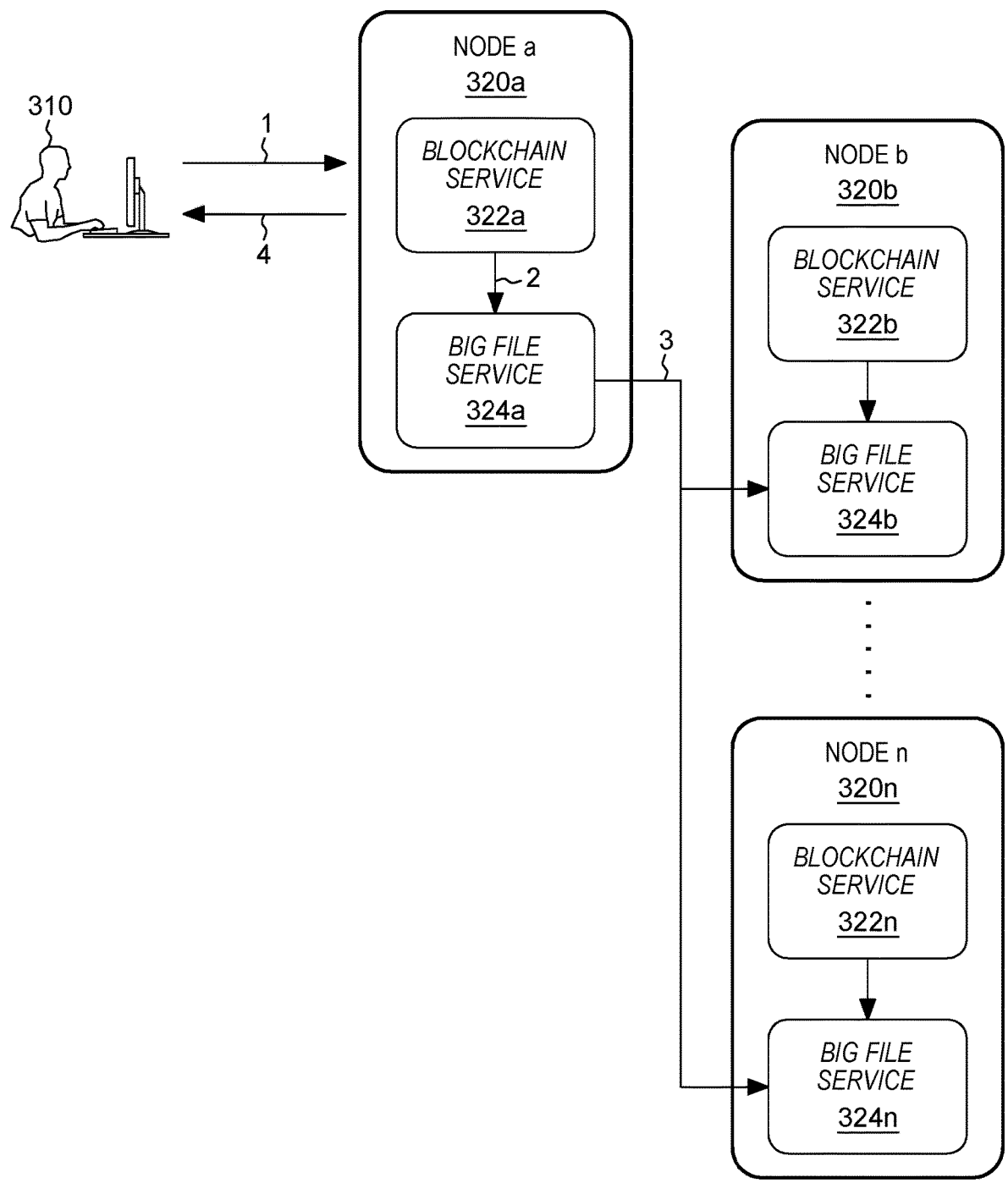
FIG. 3 depicts a conceptual diagram of an example in which a user provides a data file to blockchain peers, in accordance with aspects described herein

FIG. 3 depicts a conceptual diagram of an example in which a user provides a data file to blockchain peers, in accordance with aspects described herein. FIG. 3 depicts a user 310 communicating (via a user device/computer system) with Node a (320*a*), which itself communicates with each of Nodes b (320*b*) through n (320*n*). Each such Node includes a blockchain service 322 software that executes to perform blockchain activities such as ledger updating and synchronization, and a big file service 324 to perform other aspects described herein, such as storage and distribution of data files.

At 1, the user provides a data file to Node 320*a*. The blockchain service 322*a* leverages an Application Programming Interface (API), generating a hashcode file identifier to represent the data file in the blockchain network. As an example, the blockchain's API can save (2) the data file into the big file service 324*a* and local storage of the peer, generating a hash code to serve as the file identifier.

The data file can then be distributed (3) to other peers per a distribution policy. The distribution can be performed asynchronously. As part of the distribution, the data file can be compressed, encrypted, and/or split into separate files and distributed. Eventually a particular distribution, for instance replication to a sufficient number of peers, is achieved. Although some/all data of a data file could be distributed to a given peer, in some examples the peer is not given view or other access to the data. Access to the data file can be regulated based on a security policy, for instance. The policy could prevent a blockchain peer of the blockchain network that has the data file (or portions thereof) from viewing the data file (or the portions) if, for security reasons as an example, the peer should not be able to view the data.

Figure 4:
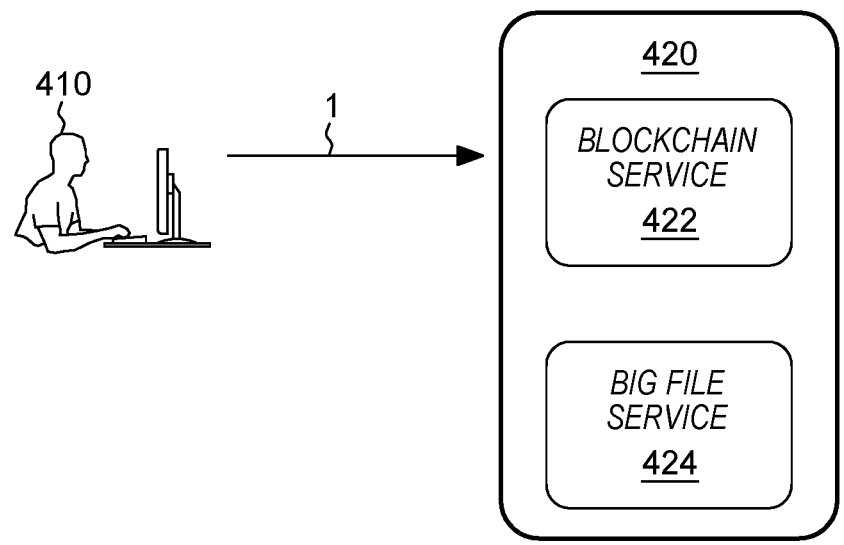
FIG. 4 depicts a conceptual diagram of an example in which a user invokes a smart contract on the blockchain network, referencing a data file stored to the blockchain network.

FIG. 4 depicts a conceptual diagram of an example in which a user invokes a smart contract on the blockchain network, referencing a data file stored to the blockchain network. Here, user 410 invokes or creates a smart contract involving a data file that is stored to Big File Service 424. This includes passing the hashcode of the data file to the blockchain peer 420. In some examples, the storage of the data file to the network and the smart contract invocation are performed in a common step. The blockchain service 422 stores the hashcode and any other relevant information to the ledger depending on how the data file is to be handled pursuant to smart contract.

Figure 5:
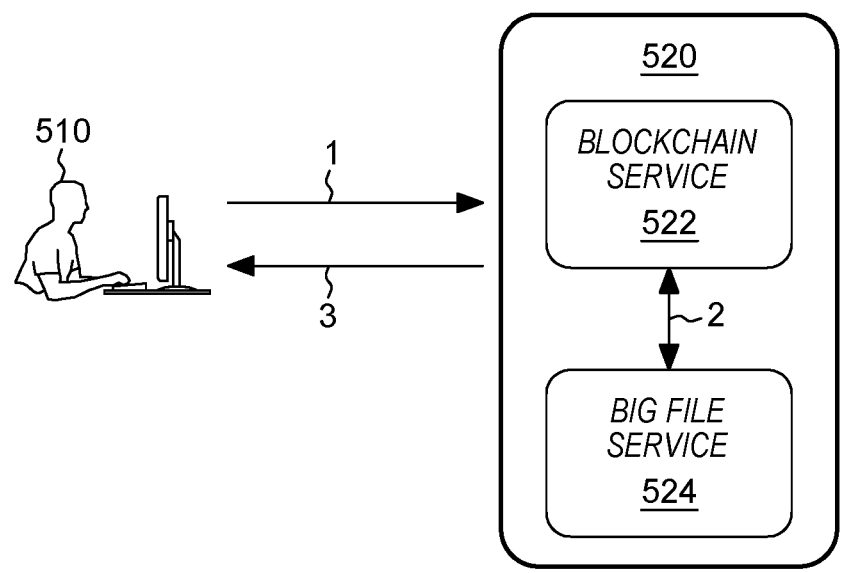
FIGS. 5 and 6 depict conceptual diagrams of examples of querying a blockchain peer for a data file of a blockchain network, in accordance with aspects described herein.
Figure 6:
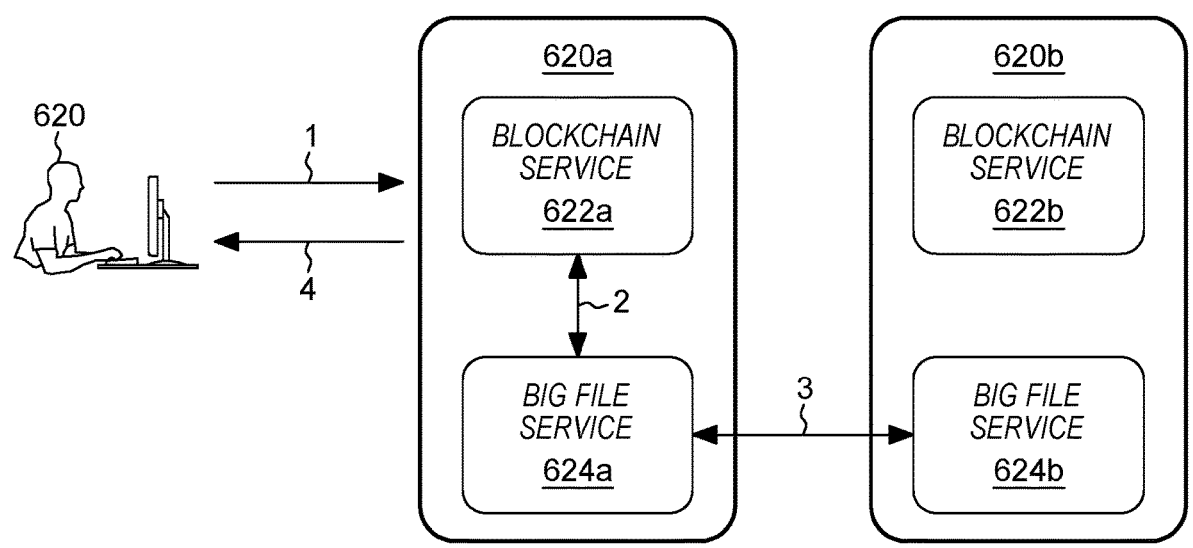

FIGS. 5 and 6 depict conceptual diagrams of examples of querying a blockchain peer for a data file of a blockchain network, in accordance with aspects described herein. When the user 510 invokes an API at 1 to query the peer (for instance to read, download, or modify the data file as examples), the file identifier (hashcode) is provided as a parameter to access the data file. The queried hashcode is recorded to the ledger by the peer 520. The API can then query (2) big file service 524 for the data file, if it resides in local storage of the peer 520. The big file service returns the file content (3) in that case. If the file content does not exist in local storage, then, referring to FIG. 6, the big file service 624*a* queries (3) the big file service(s) of other peers, for instance big file service 624*b* of peer 620*b* for peer 620*b* to query its local storage. Node 620*a* may be aware (for instance by way of the ledger or otherwise) of what other nodes store the data file, or may not already be aware. In any case, when a peer 620*b* provides the data back to node 620*a*, the data is passed back (4) to the requesting user 620. All such behavior to retrieve and access can be recorded into the ledger so that other peers can see a history of this activity.

In this manner, based on a request made to a blockchain peer to access another data file stored to the blockchain network—a data file that is not stored locally at the blockchain peer—the blockchain peer can initially determine that the blockchain peer does not have the requested data file, and then, based on information in the synchronized ledger, or elsewhere, indicating which blockchain peers of the blockchain network have at least some data of the requested data file, select a closest one or more blockchain peers that have data of the data file, and request them to provide the data of the data file.

Figure 7:
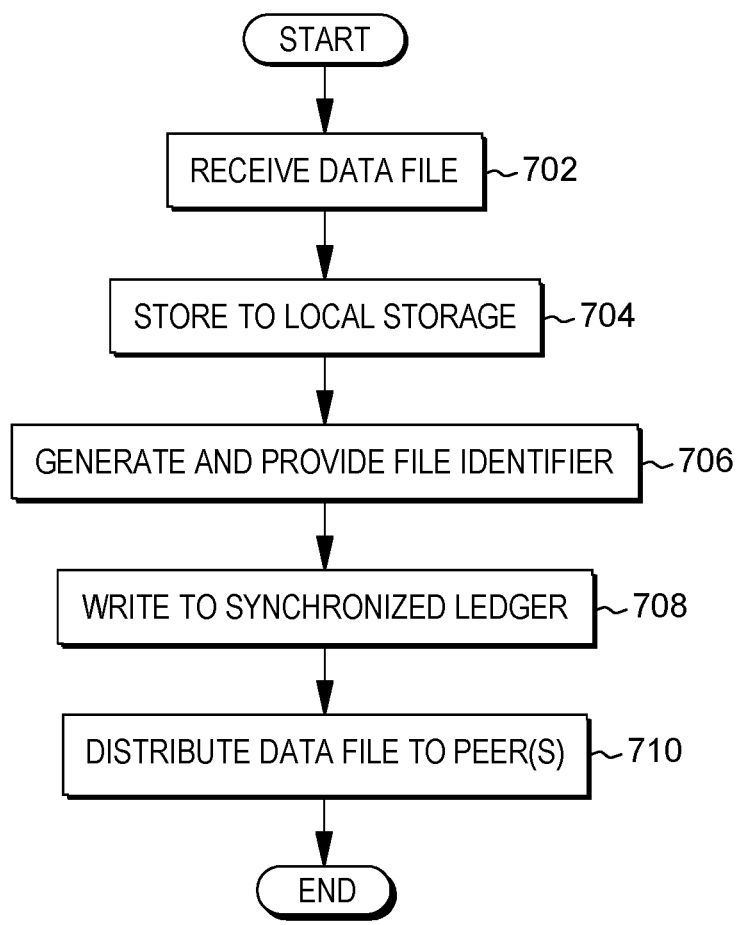
FIG. 7 depicts an example process for blockchain-based file handling, in accordance with aspects described herein.

FIG. 7 depicts an example of blockchain-based file handling, in accordance with aspects described herein. In some examples, the process is performed by one or more computer systems, such as those described herein, which may include one or more computer systems of a blockchain network, such as one or more peers thereof, and/or one or more other computer systems.

The process begins by receiving (702), by a blockchain peer of a blockchain network, a data file from a user device. The process stores (704), by the blockchain peer, the data file to local storage of the blockchain peer. The process and generates and provides (706) a file identifier of the data file. The file identifier can uniquely identify the data file and/or data thereof in the blockchain network. The file identifier is provided to the user device, for example, and the process writes (708) relevant information, for instance it stores the file identifier, to a synchronized ledger of the blockchain network. The synchronized ledger tracks access to the data file. The process also distributes (710) data of the data file to one or more other blockchain peers of a plurality of blockchain peers of the blockchain network.

In some examples, the process determines the one or more other blockchain peers to which to distribute data of the data file, and that determination is based on monitoring disk space of the one or more other blockchain peers.

The distributing can include compressing the data file to obtain a compressed data file, and distributing that compressed data file to the one or more other blockchain peers. Additionally or alternatively, the distributing can include encrypting the data file to obtain an encrypted data file, and distributing the encrypted data file to the one or more other blockchain peers.

The distributing can include splitting the data of the data file into a plurality of separate data files, and distributing a respective at least one separate data file of the plurality of separate data files (perhaps itself encrypted and/or compressed) to each of the one or more other blockchain peers. The distributing could, for instance, distribute to at least one of the one or more blockchain peers some, but not all, separate data files of the plurality of separate data files, such that some peer(s) do not store the entirety of the split data file, but instead store only portions thereof.

In some examples a restoration is performed; based on at least one selected from the group consisting of (i) loss and (ii) improper modification of the data of the data file at the blockchain peer, the process receives the data of the data file from at least one of the one or more other blockchain peers to restore the data of the data file to the blockchain peer.

Access to the data file can be regulated based on a policy, where the policy prevents a blockchain peer of the blockchain network that has the data file (or portions thereof) from viewing the data file. A storing peer could, therefore, hold the data file but be unable to view it for security reasons. In some examples, it does not have access to a decryption key to decrypt the data, for instance.

The synchronized ledger can track access of the data file on the blockchain network. View of that tracked access by way of the logged information in the ledger can be regulated such that only some blockchain peers of the blockchain network can view the tracked access. This may be useful in situations where only trusted parties (acting via designated peers) are to be able to view activity related to a data file.

In some embodiments, the process of FIG. 7 further includes, based on a request made to the blockchain peer to access another data file stored to the blockchain network, initially determining that the blockchain peer does not have the requested another data file, and then, based on information in the synchronized ledger indicating which blockchain peers of the blockchain network have at least some data of the another data file, selecting a closest one or more blockchain peers that have data of the another data file, and requesting the closest one or more blockchain peers to provide the data of the another data file.

Although various examples are provided, variations are possible without departing from a spirit of the claimed aspects.

Figure 8:
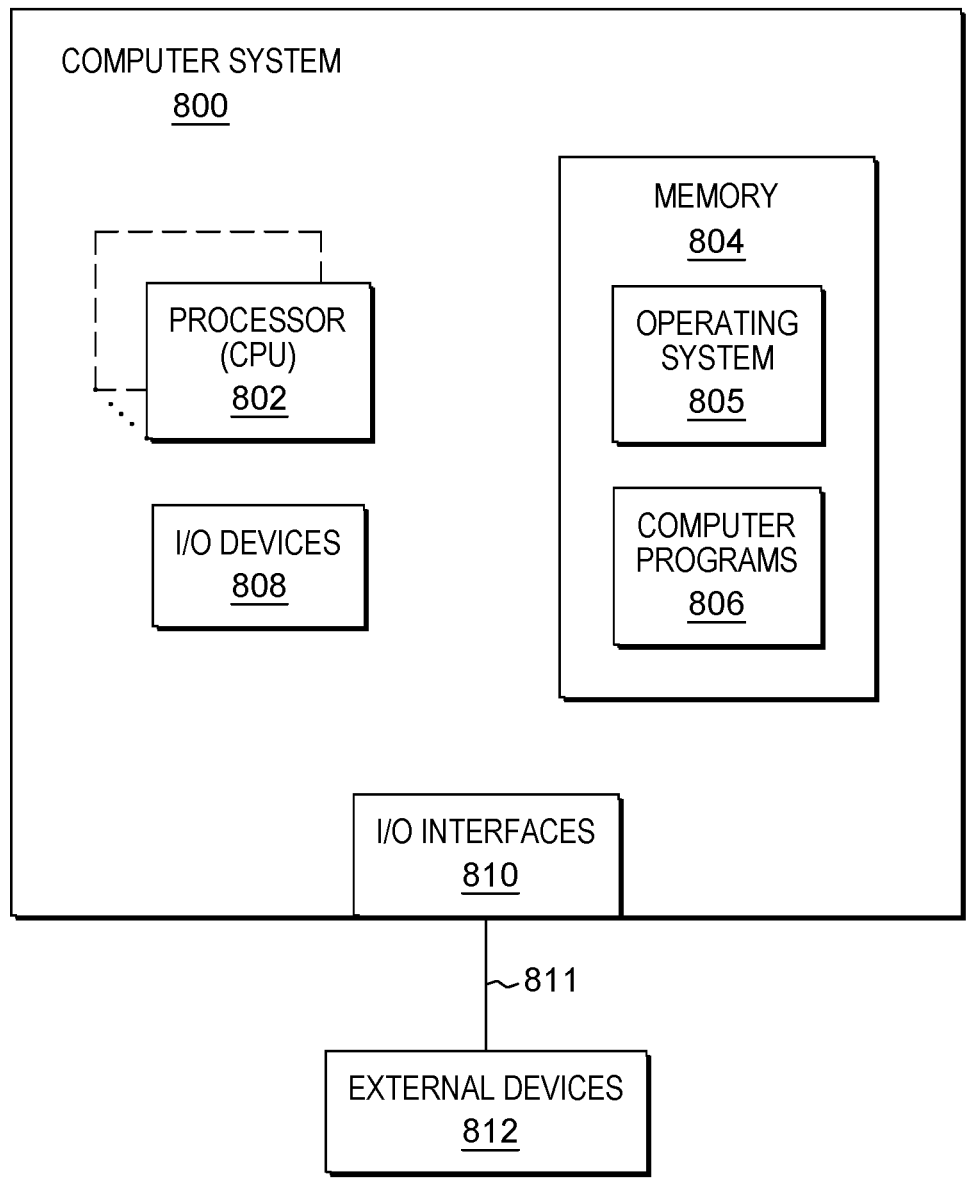
FIG. 8 depicts one example of a computer system and associated devices to incorporate and/or use aspects described herein.

Processes described herein may be performed singly or collectively by one or more computer systems, such as one or more blockchain peers/servers, as examples. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive (s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
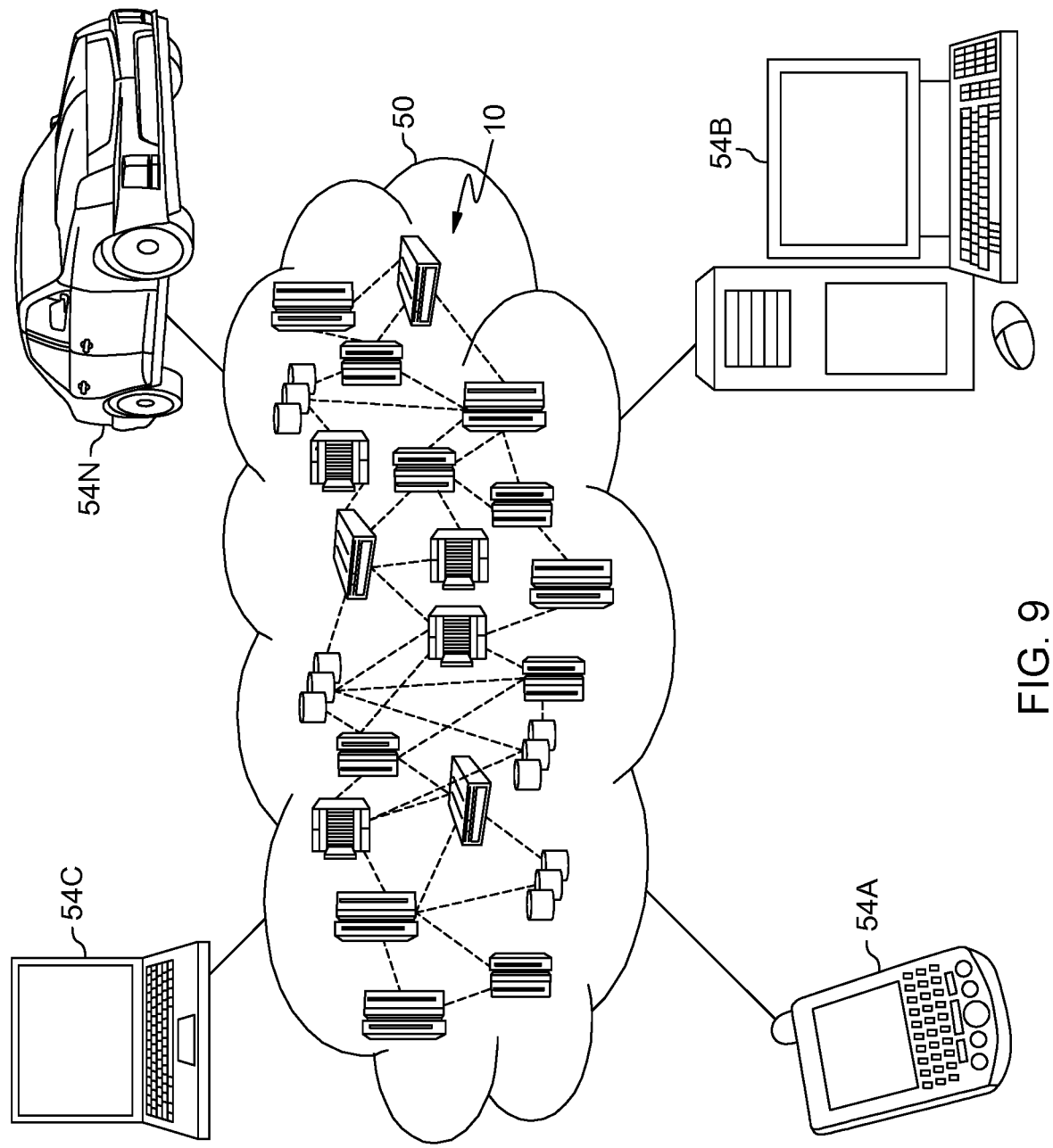
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
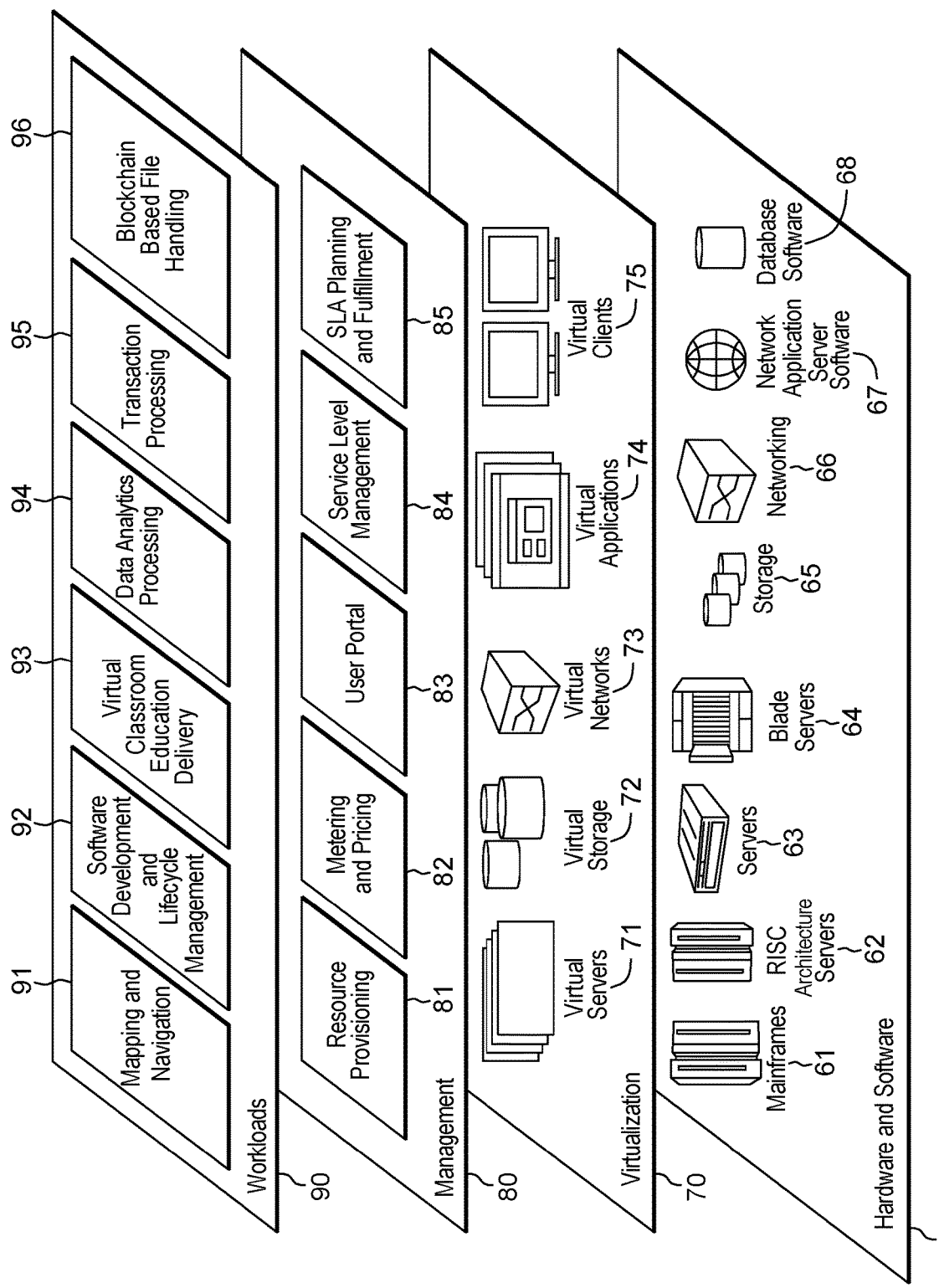
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain-based file handling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, by a blockchain peer of a blockchain network, a data file from a user device;
storing, by the blockchain peer, the data file to local storage of the blockchain peer;
generating a file identifier of the data file;
providing the file identifier to the user device;
storing the file identifier to a synchronized ledger of the blockchain network, the synchronized ledger tracking access to the data file; and
distributing data of the data file to one or more other blockchain peers of a plurality of blockchain peers of the blockchain network, wherein the distributing comprises splitting the data of the data file into a plurality of separate data files and distributing a respective at least one separate data file of the plurality of separate data files to each of the one or more other blockchain peers, wherein the distributing distributes to at least one of the one or more blockchain peers some, but not all, separate data files of the plurality of separate data files, and wherein the distributing further comprises at least one selected from the group consisting of:
compressing data of the data file, or the plurality of separate data files, to obtain compressed data, and distributing the compressed data to the one or more other blockchain peers; and
encrypting data of the data file, or the plurality of separate data files, to obtain encrypted data, and distributing the encrypted data to the one or more other blockchain peers.

2. The method of claim 1, further comprising determining the one or more other blockchain peers to which to distribute data of the data file, the determining being based on monitoring disk space of the one or more other blockchain peers.

3. The method of claim 1, wherein the distributing comprises the compressing data of the data file or the plurality of separate data files.

4. The method of claim 1, wherein the distributing comprises the encrypting data of the data file or the plurality of separate data files.

5. The method of claim 1, wherein based on at least one selected from the group consisting of (i) loss and (ii) improper modification of the data of the data file at the blockchain peer, receiving the data of the data file from at least one of the one or more other blockchain peers to restore the data of the data file to the blockchain peer.

6. The method of claim 1, wherein access to the data file is regulated based on a policy, wherein the policy prevents a blockchain peer of the blockchain network that has the data file from viewing the data file.

7. The method of claim 1, wherein the synchronized ledger tracks access of the data file on the blockchain network, and wherein view of the tracked access is regulated such that only some blockchain peers of the blockchain network can view the tracked access.

8. The method of claim 1, further comprising, based on a request made to the blockchain peer to access another data file stored to the blockchain network:
initially determining that the blockchain peer does not have the requested another data file; and
based on information in the synchronized ledger indicating which blockchain peers of the blockchain network have at least some data of the another data file, selecting a closest one or more blockchain peers that have data of the another data file, and requesting the closest one or more blockchain peers to provide the data of the another data file.

9. A computer program product comprising:
a computer readable storage medium readable by a processing circuit and storing instructions for execution by the processing circuit for performing a method comprising:
receiving, by a blockchain peer of a blockchain network, a data file from a user device;
storing, by the blockchain peer, the data file to local storage of the blockchain peer;
generating a file identifier of the data file;
providing the file identifier to the user device;
storing the file identifier to a synchronized ledger of the blockchain network, the synchronized ledger tracking access to the data file; and
distributing data of the data file to one or more other blockchain peers of a plurality of blockchain peers of the blockchain network, wherein the distributing comprises splitting the data of the data file into a plurality of separate data files and distributing a respective at least one separate data file of the plurality of separate data files to each of the one or more other blockchain peers, wherein the distributing distributes to at least one of the one or more blockchain peers some, but not all, separate data files of the plurality of separate data files, and wherein the distributing further comprises at least one selected from the group consisting of:

compressing data of the data file, or the plurality of separate data files, to obtain compressed data, and distributing the compressed data to the one or more other blockchain peers; and encrypting data of the data file, or the plurality of separate data files, to obtain encrypted data, and distributing the encrypted data to the one or more other blockchain peers.

10. The computer program product of claim 9, wherein the method further comprises determining the one or more other blockchain peers to which to distribute data of the data file, the determining being based on monitoring disk space of the one or more other blockchain peers.

11. The computer program product of claim 9, wherein access to the data file is regulated based on a policy, wherein the policy prevents a blockchain peer of the blockchain network that has the data file from viewing the data file.

12. The computer program product of claim 9, wherein the synchronized ledger tracks access of the data file on the blockchain network, and wherein view of the tracked access is regulated such that only some blockchain peers of the blockchain network can view the tracked access.

13. A computer system comprising:

a memory; and a processor in communication with the memory, wherein the computer system is configured to perform a method comprising:

receiving, by a blockchain peer of a blockchain network, a data file from a user device;

storing, by the blockchain peer, the data file to local storage of the blockchain peer;

generating a file identifier of the data file;

providing the file identifier to the user device;

storing the file identifier to a synchronized ledger of the blockchain network, the synchronized ledger tracking access to the data file; and distributing data of the data file to one or more other blockchain peers of a plurality of blockchain peers of the blockchain network, wherein the distributing comprises splitting the data of the data file into a plurality of separate data files and distributing a respective at least one separate data file of the plurality of separate data files to each of the one or more other blockchain peers, wherein the distributing distributes to at least one of the one or more blockchain peers some, but not all, separate data files of the plurality of separate data files, and wherein the distributing further comprises at least one selected from the group consisting of:

compressing data of the data file, or the plurality of separate data files, to obtain compressed data, and distributing the compressed data to the one or more other blockchain peers; and encrypting data of the data file or the plurality of separate data files, to obtain encrypted data, and distributing the encrypted data to the one or more other blockchain peers.

14. The computer system of claim 13, wherein access to the data file is regulated based on a policy, wherein the policy prevents a blockchain peer of the blockchain network that has the data file from viewing the data file.

15. The computer system of claim 13, wherein the synchronized ledger tracks access of the data file on the blockchain network, and wherein view of the tracked access is regulated such that only some blockchain peers of the blockchain network can view the tracked access.

* * * * *